United States Patent [19]
Oota et al.

[11] Patent Number: 4,459,524
[45] Date of Patent: Jul. 10, 1984

[54] FOOD PROCESSOR

[75] Inventors: Hiroyuki Oota, Iwakura; Ryuuho Narita, Nagoya, both of Japan

[73] Assignee: Tokyo Shibaura Denki Kabushiki Kaisha, Kawasaki, Japan

[21] Appl. No.: 332,295

[22] Filed: Dec. 18, 1981

[30] Foreign Application Priority Data

Dec. 24, 1980 [JP] Japan ................................ 55-184415
Dec. 29, 1980 [JP] Japan ................................ 55-187393
Jan. 23, 1981 [JP] Japan ................................ 56-9429

[51] Int. Cl.³ ..................... H01H 43/04; H01H 43/16
[52] U.S. Cl. .................................... 318/484; 99/285; 99/286; 318/265; 318/452; 307/141; 307/141.4; 219/10.55 B
[58] Field of Search .................. 318/264–265, 318/490, 449, 450, 459, 484, 466, 308, 331, 452–453, 467–468, 704, 743, 766, 445–446; 79/280, 285–286, 327, 332; 328/129, 130; 307/141.4, 141; 340/309.1, 309.4, 318; 368/10; 219/10.55 B

[56] References Cited

U.S. PATENT DOCUMENTS

| | | | |
|---|---|---|---|
| 4,069,750 | 1/1978 | Kemp | 99/280 |
| 4,131,855 | 12/1978 | Hamagana | 328/129.1 |
| 4,172,413 | 10/1979 | Roseberry | 99/286 |
| 4,196,658 | 4/1980 | Takagi | 99/286 |
| 4,209,972 | 7/1980 | Fukuichi | |
| 4,254,460 | 3/1981 | Achter et al. | 307/141 |
| 4,280,063 | 7/1981 | Yokomori et al. | 307/141.4 |
| 4,345,132 | 8/1982 | Takase et al. | 219/10.15 |

FOREIGN PATENT DOCUMENTS 1579562 9/1969 Fed. Rep. of Germany .
2358698 7/1977 France .

OTHER PUBLICATIONS

GRUNDIG TECHNISCHE INFORMATIONEN, vol. 26, No. 6, 1979, pp. 324–326 Furth (BRD) O. Thiel: LCD-Digital-Schaltuhr Radio-Recorder Spitzenklasse.

ELEKTOR, vol. 5, No. 5, May 1979, pp. 5-08-5-12, Canterbury (GB); "Programmable Timer/Controller".

*Primary Examiner*—B. Dobeck
*Assistant Examiner*—Arthur G. Evans
*Attorney, Agent, or Firm*—Cushman, Darby & Cushman

[57] ABSTRACT

A food processor is comprised of a food processing cutter which is driven by a motor connected to an AC power source, a switch for controlling on and off of the motor, a pulse generator for forming count pulses having a given period from the AC power source, a set switch, a start switch, and a timer which operates the start switch at a time point set therein to start the rotation of the motor. Further, the food processor includes an up-counter for counting the count pulses while the set switch is operated to store a driving time period data of the motor, and a down-counter to which the stored data of the up-counter is transferred when the start switch is operated by the timer. The down-counter counts down the data every time it receives the count pulse and produces a drive stop signal for the motor when its contents become "0".

6 Claims, 8 Drawing Figures

FOOD PROCESSOR

BACKGROUND OF THE INVENTION

The present invention relates to a food processor and, more particularly, to a control circuit for controlling a food processing operation time period and the start time of the food processing operation.

A food processor such as a combination type coffee maker of a drip mechanism (pot) with a mill mechanism is disclosed in U.S. Pat. No. 4,196,658 issued to Takagi et al on Apr. 8, 1980 which is assigned to the same assignee as this application. Since the mill mechanism in the coffee maker of this type may be operated to mill coffee beans into coffee powder immediately before the drip mechanism is operated to pour the water into the coffee powder to extract coffee, the coffee maker has the advantage of preventing the coffee powder from being wet and losing a flavor of coffee. The coffee mill mechanism includes a cutter coupled with a motor so that a grain size of coffee powder primarily depends on a length of driving time of the motor. Therefore, the coffee mill mechanism is generally designed such that, to adjust a grain size of the coffee powder to a desired value, the motor driving time may be set by a manual switch or a spring driven timer. The former approach, however, has a defect that, since the milling time or the motor driving time is set depending on the intuition of an operator, the setting of the milling time is instable. In the later approach, the time setting operation for the spring driven timer is likely to be inaccurate, thus resulting in an unfixed milling time. Further, for timely providing processed foods, there has been desired a practical food processor which can accurately control food processing time period and automatically start the processing operation of the foods. In the case of coffee maker for example, it is demanded that the operations to mill coffee beans into coffee powder and to make coffee from the coffee powder are started automatically at a given time.

SUMMARY OF THE INVENTION

Accordingly, an object of the present invention is to provide a food processor which can timely perform the food process only for accurate and desired time period, with a simple operation and in a reliable manner.

According to the present invention, there is provided a food processor with a processing member driven by a motor coupled to a power source, comprising: a switching element for connecting the motor with the power source; a pulse generator coupled to the power source for generating count pulses with a given period; and a food processing operation time controller including a set switch, a first counter for counting the count pulse in response to an operation of the set switch and for storing a driving time data of the motor, a display unit for displaying an output data of the first counter, a second counter for storing the output data transferred from the first counter, and for counting the count pulse to produce a control signal of the switching element at a time point that the counting result reaches a given value, and a start switch for controlling the timing of transferring the output data of the first counter to the second counter and the counting operation of the second counter.

According to the apparatus of the present invention, a given rotating time of the motor is set in the form of digital data and the motor may be rotated for the time given by the digital data set. Therefore, the food processing time by the cutter, for example, may be controlled accurately. If the starting time of the motor drive is preset in a timer, the food processing may be started at the set time by turning on the start switch in response to the output signal from the timer.

DETAILED DESCRIPTION OF THE PREFERRED EMBODIMENTS

The present invention will be described in detail referring to FIGS. 1 and 2, on the basis of an embodiment in which the present invention is applied for a coffee maker with a mill mechanism.

Figure 1:
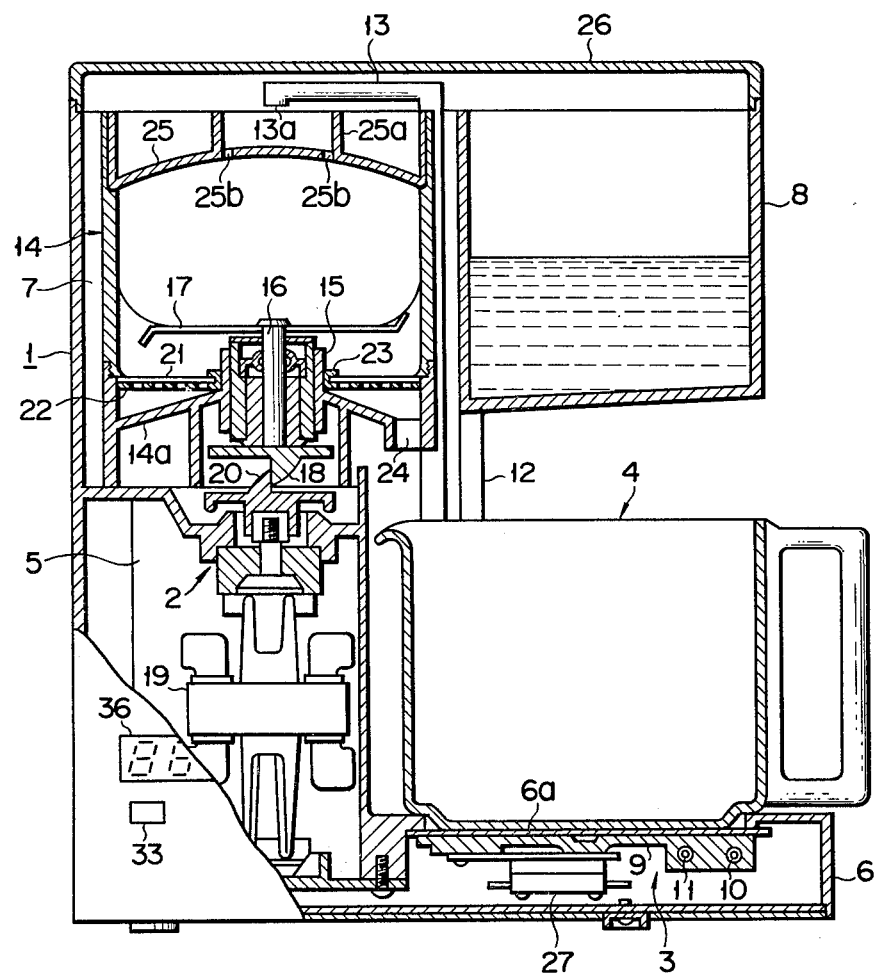
FIG. 1 is a longitudinal sectional view of a main body of a coffee maker which is an embodiment of the present invention.

A coffee maker shown in FIG. 1 is disclosed in U.S. Pat. No. 4,196,658, assigned to the same assignee as of the present patent application. This will briefly be discussed for a better understanding of the present invention. In the figures, a housing 1 contains a mill mechanism 2 for milling coffee beans into coffee powder, a drip mechanism 3, as a hot water feed mechanism, for dripping hot water into the coffee powder to brew coffee, and a bottle 4 for reserving coffee. A motor container 5 and a bottle table 6 are disposed on both sides of the lower part of the housing 1. A case loading section 7 and a reservoir tank 8 are disposed on both sides of the upper part of the housing 1. A heater support 9, provided in an intimate contact with the lower surface of a heater plate 6a, is provided with an electrical heater, e.g. a sheathed heater 10, and a heating pipe 11 which are buried therein in a parallel arrangement. One end of the heating pipe 11 is upwardly extended to form a water feed pipe 12 connecting to a water outlet (not shown) of the reservoir tank 8. The other end of the heating pipe 11 is upwardly extended to form a hot water feed pipe 13 of the case loading section 7. A case 14, loaded into the case loading section 7, is provided in common for both the mill mechanism 2 and the drip mechanism 3. A drive shaft 16 is rotatably and water-tightly inserted into a shaft tube 15 formed at the central portion of a bottom wall 14a of the case 14. A cutter 17 for milling coffee beans into coffee powder is provided in the upper part of the drive shaft 16. A joint 18, provided in the lower part of the shaft 16, is coupled with a joint 20 of a motor 19 disposed in the motor container 5. A filter 21 is mounted under the cutter 17 by means of a frame-shaped filter support 22 and a water-tight member 23 to receive the coffee powder. An extraction outlet 24 formed in a bottom wall 14a of the case 14 is opened into the upper end opening of the bottle 4 removably placed on the bottle table 6. A cover 25 is removably mounted at the upper end opening of the case 14. The cover 25 has a tubular wall 25a upstanding at the substantially central portion of the cover and hot water pour-in holes 25b are formed within the tubular wall 25a. A port 13a at the distal end of the hot water feed pipe 13 is opened into the tubular wall 25a from the above. A cover 26 as a part of the housing 1 is removably mounted at the upper end opening of the reservoir tank 8. A bimetal switch 27 is contacted with the under surface of the heater plate 9 for controlling the temperature thereof to a predetermined value.

Figure 2:
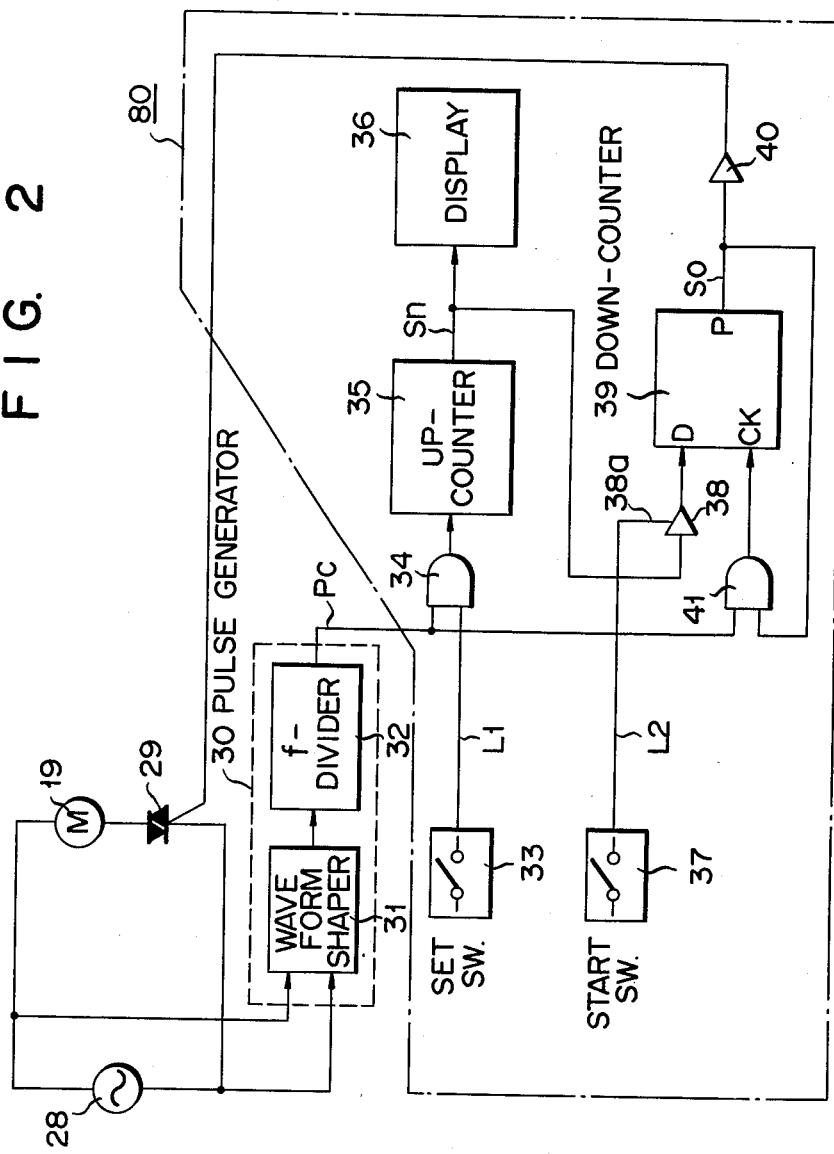
FIG. 2 is a block diagram of an embodiment of a milling time controller in a control circuit for the coffee maker shown in FIG. 1.

The coffee maker in accordance with the present invention includes a milling time controller 80 and its assosiated circuits as shown in FIG. 2, and will be described. Between the output terminals of an AC power source 28 is coupled a series circuit of a bidirectional thyristor 29 as a switching element and the motor 19. A pulse generator 30 comprises a wave-form shaper 31, e.g. Schmidt trigger circuit for shaping an output voltage waveform of the AC power source 28 and a frequency divider 32 for frequency-dividing an output signal of the wave-form shaper 31 to produce count pulses Pc at 1 Hz, for example, as reference pulses. A set switch 33 is turned on only when it is operated in a manual mode. Only when the set switch 33 is operated, a high level signal is applied to one input terminal of an AND circuit 34 by way of a line L1. The AND circuit 34 is so connected as to receive at the other input terminal the count (reference) pulse Pc. Accordingly, the AND circuit 34 is enabled to pass the count pulse Pc during only an ON period of the set switch 33. Reference numeral 35 designates a first counter as an upcounter of scale-of-16. The up-counter 35 increasingly counts up the count pulses Pc passed through the AND circuit 34, and produces an output indicative of the counting result in the form of a digital signal Sn. A digital display unit 36 is comprised of four digits, each of which is made up of seven segments light emitting diodes, and displays the digital signal Sn in the form of the corresponding numerical figures. A start switch 37 is turned on at a set time of a timer 49 to be described later. When the start switch is turned on, a high level signal is applied to a control terminal 38a of a transfer gate 38, through a line L2. The transfer gate 38 is enabled to pass a signal only when it receives a high level signal at the control terminal 38a, exhibiting a low impedance. A down-counter 39 with a preset function, as a second counter, stores a numerical value corresponding to the input digital signal applied to the data input terminal D and then decreasingly counts it down by one every time it receives the count pulse Pc. The counter 39 produces an operation start signal So of high level during a period except that the count value is "0". An output terminal P of the down-counter 39 is connected to a gate of the unidirectional thyristor 29, through a buffer amplifier 40. A data input terminal D of the down-counter 39 is connected to the output terminal of the up-counter 35, through a transfer gate 38. The clock input terminal CK is connected to the output terminal of an AND circuit 41. One of the input terminals of the AND circuit 41 is so connected as to receive the count pulse Pc. The other input terminal of the AND circuit 41 receives the operation start signal So. The set switch 33 and the digital display unit 36 are disposed at the side wall of the housing 1, as shown in FIG. 1.

Figure 4:
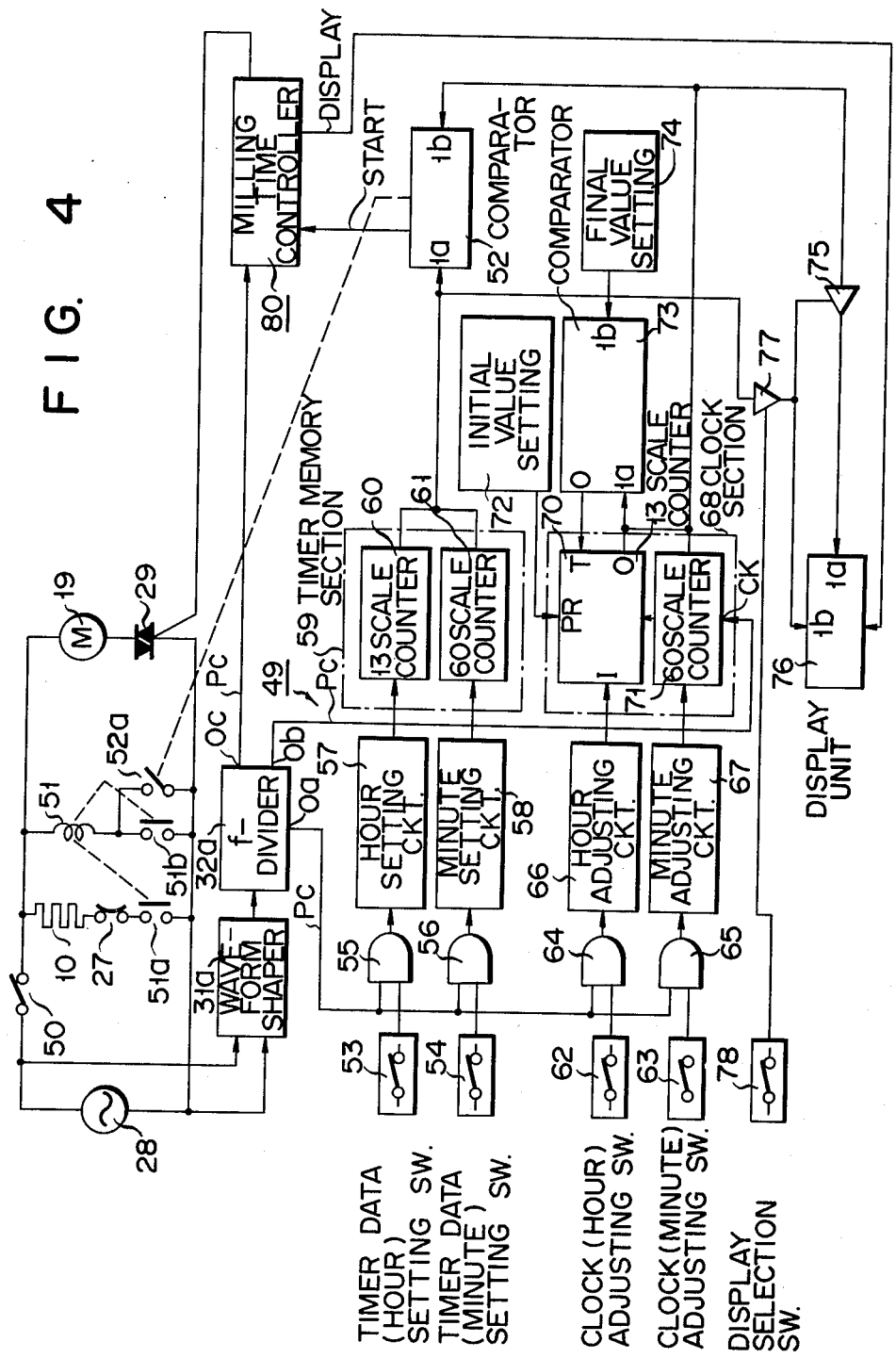
FIG. 4 is a block diagram of an embodiment of a control circuit for the coffee maker shown in FIG. 1.

The operation of the coffee maker thus constructed will be described. In making coffee, an amount of water corresponding to a desired number of persons is poured into the reservoir tank 8 and the corresponding amount of coffee beans is put in the case 14. Under this condition, the power switch (not shown) is turned on and the set switch 33 is turned on to keep the ON state. Then, the count pulse Pc from the pulse generator 30 is applied through the AND circuit 34 to the upcounter 35 which, in turn, increasingly counts up the count pulses Pc and produces the output in the form of a digital signal Sn. At this time, numerals corresponding to the digital signal Sn is displayed in a successively increasing manner such as "1", "2", "3", . . . on the display unit 36. When a proper numeral, for example, "10", is displayed on the unit 36, the operator releases the ON state of the set switch 33. When the ON state of the set switch 33 is released, no high level signal appears on the line L1 and the AND circuit 34 blocks the passage of the count pulse Pc. As a result, the up-counter 35 stops its counting operation, stores the numeral "10" as the counting result and produces the digital signal Sn representing the numeral "10". Accordingly, at this time, the display unit 36 continues the display of the numeral "10". Then, the start switch 37 is turned on by a timer 49 to be described later referring to FIG. 4. As a result, the transfer gate 38 allows the passage of the signal, so that the digital signal Sn stored in the up-counter 35 is applied to the data input terminal D of the down-counter 39. Upon the receipt of the signal Sn, the down-counter 39 presets the numeral "10" corresponding to the input signal Sn, while at the same time produces the operation start signal So at the output terminal P. The operation start signal So goes to the gate of the bidirectional thyristor 29 through the buffer amplifier 40, to feed current to the motor 19 and to rotate the cutter 17. In this way, the operation of milling the coffee beans starts. At the same time, the operation start signal So is applied to one of the input terminals of the AND circuit 41, so that it allows the count pulse Pc to pass therethrough. As a result, the down counter 39 which receives at the clock input terminal CK the count pulse Pc starts the down-count operation. The down-count operation proceeds in a manner that the preset value "10" is decremented one by one such as "10", "9", "8", . . . . With the progression of the down count operation, the down-counter 39 has the count of "0". At this time, the down-counter 39 produces at the output terminal P a low level signal in place of the operation start signal So. Upon receipt of the low level signal, the bidirectional thyristor 29 is turned off to stop the rotation of the cutter 17. Accordingly, the operation of milling the coffee beans is finished, while at the same time the AND circuit 41 is disabled to stop the supply of the count pulse Pc to the down-counter. Since the period of the count pulse Pc is 1 second, a time taken for the count of the down-counter 39 to be decremented from the "10" to "0" is 10 seconds. Accordingly, the milling time of the coffee beans is controlled to 10 seconds. After the coffee beans are milled in this way, a cup 4 is placed on the heater plate 6a of the cup table 6 and the opening at the top of the cup 4 aligns with the outlet 24 of the case 14. Then, when a hot water forming switch 51a to be described later referring to FIG. 4 is turned on, the sheathed heater 10 is fed with current through the bimetal switch 27 to be heated, so that the heater plate 6a preheats the cup 4, while at the same time water in the heating pipe 11 supplied from the reservoir tank 8 through the water feed pipe 12 is heated to boil the water. The boiling water rises through the hot water feed pipe 13 due to its boiling pressure to be fed from the water supply outlet 13a at the distal end into the inside of the standing wall 25a of the cover 25. Then, the boiling water drips through the hot water perforations 25b into the case 14. The boiling water supplied into the case 14 passes through the coffee powder and filter 21 to be brewed into coffee. The coffee is poured into the cup 4 though the outlet 24 of the case 14. The brewing operation of coffee is completed after the water reserved in the reservoir tank 8 is completely consumed.

The first and second counters 35 and 39 may be comprised of a conventional reversible counter. The electric circuit of FIG. 2 may be also comprised of using a microcomputer. It will be understood that the food process in the present invention is not necessarily limited to the coffee making. According to the present embodiment, if a milling time is set by holding the set switch in an on state until the display unit 36 displays "10" (10 seconds), for example, and then, a start switch 37 is turned on by the timer 49 shown in FIG. 4, the cutter 17 may be rotated correctly for 10 seconds. According to the present embodiment, the cutter can be rotated for a desired time period reliably, with a simple construction and easy operation.

Figure 3:
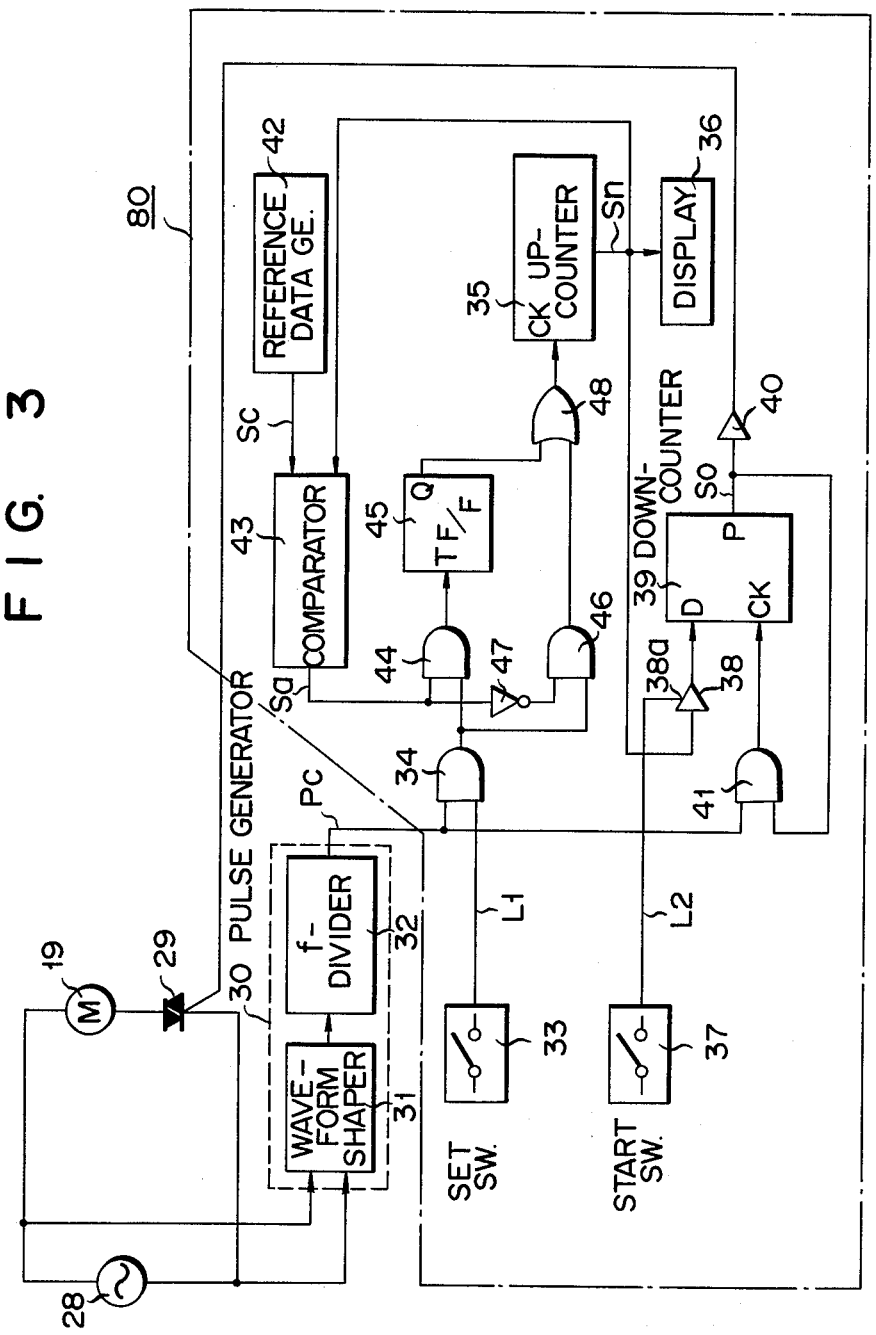
FIG. 3 is a block diagram of another embodiment of the milling time controller in a control circuit for the coffee maker shown in FIG. 1.

Another example of the milling time setting will be described referring to FIGS. 1 and 3. In FIG. 2, the display time period of each output pulse from the up-counter 35 is all the same. In setting the milling time, however, it is preferable that the display period of the final display data corresponding to a given setting period is set longer than the display period taken for the display data to reach the display of the final data (for example, the former is two times longer than the latter). A circuit shown in FIG. 3 realizes such a function. In the explanation of FIGS. 1 and 3, like symbols are used for designating like portions in FIG. 2, for simplicity of explanation.

A reference data generator 42 in FIG. 3 produces a signal Sc representing "12" when the rotating period of the cutter 17 is set at 12 seconds. A comparator 43 compares the output signal Sc of the reference data generator 42 with an output signal Sn of a scale-of-16 counter 35, and produces a high level coincident signal Sa when both signals are coincident with each other. An output signal of the AND circuit 34 (first AND circuit) and the coincident signal Sa of the comparator 43 are applied to a second AND circuit 44. An output signal of the AND circuit 44 is applied to an input terminal T of a flip-flop (F/F) circuit 45. The polarity of the output pulse from the output terminal Q of the F/F circuit 45 is inverted every time an pulse is supplied to the input terminal T. A third AND circuit 46 is so connected as to receive the output signal of the first AND circuit 34 and the coincident output signal Sa of the comparator 43 through an inverter 47. The output terminal Q of the F/F circuit 45 and the output terminal of the third AND circuit 46 are connected to input terminals of an OR circuit 48 of which the output signal is applied to an input terminal CK of the up-counter 35. As in the circuit of FIG. 2, the output signal of the counter 35 is applied to the data input terminal D of the down-counter 39 by way of the transfer gate 38. An output signal of the AND circuit (fourth AND circuit) 41 is applied to the clock terminal CK. The down-counter 39 produces at the terminal P a high level signal So when the result of the down counting in the counter 39 is "0". The output signal So is applied as a control signal to the bidirectional thyristor 29 by way of the buffer amplifier 40, and applied as a control signal to the AND circuit 41.

The operation of the circuit of FIG. 3 will be described. In preparation for making coffee, an amount of water corresponding to the amount of coffee to be made is put in the reservoir tank 8, and the corresponding amount of coffee beans are put in the case 14 while the cup 4 is placed on the bottle table 6 so that the top opening of the cup 4 is aligned with the outlet 24 of the case 14. Then, the power switch (not shown) is turned on, and the set switch 33 is held in an ON state, as in the case of FIG. 2. At this time, the up-counter 35 produces a digital signal Sn representing "0". When the output data of the reference data generator 42 is "12", the output signal Sa of the comparator 43 is in low level and hence the third AND circuit 46 is in an enabling state, while the second AND circuit 44 is in a desabling state. Accordingly, upon receipt of the count pulse Pc through the first AND circuit 34, the third AND circuit 46 and the OR circuit 48, the up-counter 35 starts the counting operation and produces a digital signal Sn representing the counting contents. At this time, the digital display 36 displays the number of the pulses Pc in an increasing manner such as "0", "1", "2", . . . . Since the period of the pulse Pc is one second, the display period is 1 second. When the counter counts 12 of Pc pulses, the output signal Sn of the counter 35 represents "12" and coincides with the output signal Sc of "12" from the reference data generator 42. As a result, the signal Sa becomes high level, so that the third AND circuit 46 is disabled and the second AND circuit 44 is enabled. When the 13th count pulse Pc is applied to the input terminal T of the F/F circuit 45 through the second AND circuit 44, the output signal from the output terminal Q of the F/F circuit 45 is inverted from high to low in level. Accordingly, the up-counter 35 does not count the 13th pulse Pc and the output state of the up-counter 35 is not changed during the period of the 13th pulse Pc. Therefore, the display "12" of the display unit 36 is held as it stands. The 14th count pulse Pc is supplied to the F/F circuit 45 through the second AND circuit 44. At this time, the output signal of the F/F circuit 45 is inverted from low to high in level. Therefore, the up-counter 35 counts the high level signal, so that the output signal Sn increases from "12" to "13". Upon this, the output signal Sa of the comparator 43 becomes low level again. As a result, the counter 35 is enabled to count the pulse Pc supplied through the AND circuit 46 and the OR circuit 48 in the same manner as described above so that the displayed numeral on the display unit 36 is changed again every one second such as "13", "14", "15", "0", and "1". In other words, when the display numeral of the display unit 36 is stepped up by turning on the set switch 33, only the numeral "12" is displayed for a double period of that of the remaining numerals. The numeral "12" here is selected only by way of example, since the numeral is most frequently used as the milling time in the mill mechanism 2. It is evident that the numeral may be set at any other suitable value if necessary. Further, any set data can be displayed for a longer time than that of other numerals.

Thus, the operator sees the display numeral on the display unit 36 and releases the ON state of the set switch 33 when the display unit 36 displays a proper numeral "12". When the ON state of the set switch 33 is released, no high level signal appears on the line L1, so that the AND circuit 34 blocks the passage of the count pulse Pc. Accordingly, the up-counter 35 stops the count operation to store the final resultant count, "12", and to produce a digital signal Sn representative of the count "12". At this time, the digital display unit 36 is left displaying the numeral "12". Then, when the start switch 37 is turned on by the timer 49 later described, the transfer gate 38 permits the passage of the signal, so that the digital signal Sn stored in the up-counter 35 is applied to the data input terminal D of the down-counter 39. Accordingly, the numeral "12" of the digital signal Sn is preset in the down-counter 39 which, in turn, produces an operation start signal So through the output terminal P. The operation start signal So goes through the buffer amplifier 40 to the gate of the bidirectional thyristor 29. Upon receipt of the signal So, the thyristor 29 is turned on to feed current to the motor 19. Then, the motor 19 is driven to rotate the cutter 17 to start the milling of the coffee beans in the case 14. Simultaneously, the operation start signal So is applied to one of the input terminals of the fourth AND gate 41. As a result, the AND circuit 41 is enabled to pass the count pulse Pc so that the down-counter 39 receives the count pulse Pc at the clock input terminal CK to start the down counting operation. The down counting operation is performed in a manner that the preset value "12" is decremented one by one such as "12", "11", "10", . . . . When the count of the down-counter 39 becomes "0", it produces at the output terminal P a low level signal in place of the operation start signal So. Accordingly, the bidirectional thyristor 29 stops the rotation of the cutter 17 and the milling of the coffee beans ends. At the same time, the AND circuit 41 is inhibited from passing the count pulse Pc to the down-counter 39. A time period taken for the down-counter 39 to down-count from "12" to "0", is 12 seconds since the output period of the count pulse Pc is defined by 1 Hz. Therefore, the milling time of the coffee beans is controlled to be 12 seconds. After the milling mechanism 2 milling the coffee beans into coffee powder, the hot water supply switch 51a shown in FIG. 4 is turned on in response to a control signal of the timer 49, so that an electric current is supplied from the power source 28 to the sheathed heater 10 through the bimetal switch 27. As a result, the cup 4 is preheated, while at the same time water in the heat pipe 11 fed from the reservoir tank 8 through the water feed pipe 12 is heated to the boiling point. The vapor pressure makes the hot water go up through the water supply pipe 13 and the water is poured into the space surrounding the standing wall 25a of the cover 25 from the hot water inlet 13a at the distal end of the pipe 13. Then, the hot water is dripped from the pouring perforations 25b into the case 14. The hot water supplied into the case 14 further passes through the coffee powder and the filter 21 to extract coffee. The coffee is put into the cup 4 through the outlet 24 of the case 14. The complete consumption of the water in the tank 8 terminates the coffee making operation. This is exactly the same as that in the embodiment of FIG. 2. In the present embodiment, however, the display period of the set data is longer than that of the other data. This provides an easy check of the set data to facilitate the setting of the milling time.

The embodiments shown in FIGS. 2 and 3 are designed aiming at the accurate control of the processing (milling) time. In this field, it is convenient to automatically start the food processing at a specific time, e.g. 12:30 noon. Since the coffee maker shown in FIG. 1 is provided with the heater 10 to heat the water to be poured into the coffee powder, it is desirable to start automatically the milling operation of the coffee beans and, then, the dripping operation by way of the heater 10. Turning now to FIG. 4, there is shown a coffee maker with a timer for effecting such operations. For the time for driving the motor 19 for the cutter 17, the control circuit shown in FIG. 2 or 3 is directly applicable for the present embodiment. Accordingly, the control section for this purpose is illustrated by a block of the milling time controller denoted as 80.

Figure 5A:
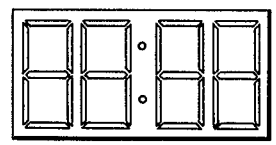
FIGS. 5A to 5C illustrate some examples of displays by display unit used in the timer shown in FIG. 4.

A single phase AC power source of 100 V and 60 Hz is connected at both ends with a series circuit including a power switch 50, an electric heater 10 as a load of the drip mechanism 3, a thermal switch 27 and a normally open contact 51a of a relay 51. The series circuit of these components is connected in parallel with another series circuit including the relay 51 and an output switch 52a of the comparator 52. The output switch 52a is connected in parallel with a self-holding, normally open contact 51b of the relay 51. The mechanism of the drip mechanism 3 and its operation have been described referring to FIG. 1. No further explanation will be given here. At timer 49 includes a microcomputer of which the hardware logic circuits are illustrated in FIG. 4. A wave-form shaper 31a shapes the positive half wave supplied from the AC power source into a rectangular wave. The frequency dividing circuit 32a frequency-divides an output signal of the wave-form shaper 31a to provide a single high level signal for one second to the output terminals Oa and Oc. The constructions of the wave form shaper 31a and the frequency divider 32a are exactly the same as those 31 and 32 in FIG. 2. An "hour" data setting switch 53 and "minute" data setting switch 54 for the timer produce a high level signal when depressed, respectively. AND circuits 55 and 56 are coupled at the first input terminals with the output terminal Oa of the frequency dividing circuit 32a. The "hour" data setting signal is applied from the switch 53 to the second input terminal of the AND circuit 55. The "minute" data setting signal is applied from the switch 54 to the second input terminal of the AND circuit 56. An output signal of the AND circuit 55 is applied to the input terminal of an "hour" data setting circuit 57. An output signal of the AND circuit is applied to the input terminal of the "minute" data setting circuit 58. The "hour" data setting circuit 57 and the "minute" data setting circuit 58 produce each a high level count pulse corresponding to the leading edge, for example, of the high level signal (pulse) applied to the input terminal thereof. A timer memory section 59 comprises a scale-of-13 counter 60 as the "hour" data counting circuit and a scale-of-60 counter 61 as the "minute" data counting circuit. A count pulse applied from the output terminal of the "hour" data setting circuit 57 is applied to the input terminal of the scale-of-13 counter 60. The count pulse from the output terminal of the "minute" data setting circuit 58 is applied to the input terminal of the scale-of-60 counter 61. The output of the counters 60 and 61 is supplied to the first input terminal Ia of the comparator 52, respectively. An "hour" adjusting switch 62 for the clock produces a high level "hour" adjusting signal while it is depressed. A "nimute" adjusting switch 63 for the clock produces a high level "minute" adjesting signal while it is depressed. AND circuits 64 and 65 receive at the first input terminals an output pulse from the output terminal Oa of the frequency divider 32a. An "hour" adjusting signal is applied from the "hour" adjusting switch 62 to the second input terminal of the AND circuit 64. A "minute" adjusting signal is applied from the "minute" adjusting switch 63 to the second input terminal of the AND circuit 65. An output signal of the AND circuit 64 is applied to the input terminal of the "hour" adjusting circuit 66. An output signal of the AND circuit 65 is applied to the input terminal of the "minute" adjusting circuit 67. The "hour" and "minute" adjusting circuits 66 and 67 produce high level count pulses in response to the leading edge of the high level adjusting signal (pulse) applied from the AND circuits 64 and 65, respectively. A clock section 68 has a scale-of-13 counter 70 of the preset type as an "hour" counter circuit for the clock and a scale-of-60 counter as the "minute" counter circuit. The count pulse is applied from the "hour" adjusting circuit 66 to the input terminal I of the scale-of-13 counter 70. The count pulse is applied from the "minute" adjusting circuit 67 is applied to the input terminal of the scale-of-60 counter 71. The output of the counters 70 and 71 is respectively applied to the second input terminal Ib of the comparator 52. When the timer data applied to the input terminal Ia from the timer memory section 59 and the clock data (current time) applied to the input terminal Ib from the clock section 68 are coincident with each other, the comparator 52 produces a drive signal which, in turn, turns on the output switch 52a. In the scale-of-13 counter 70 of the clock section 68, an output signal representing an initial value "1" of an initial value setting circuit 72 is applied to the preset input terminal PR. The 13 scale counter 70 supplies from the output terminal O an output signal representing the clock data to the first input terminal Ia of the comparator 73. The second input terminal Ib of the comparator 73 is supplied with an output signal representing the final value "12" of the final value setting circuit 74. When the clock data is coincident with the final value "12", the comparator 73 produces from the output terminal O a high level coincident signal which in turn is applied to the trigger input terminal T of the 13 scale counter 70. An output pulse of the frequency divider 32a is applied as a clock pulse to the clock input terminal CK of the clock section 68. In the clock section 68, the 60 scale counter 71 sequentially counts up from "0" to "1", "2", . . . every time it receives the clock pulse. The 60 scale counter 71 counts up to 37 59" receives the next clock pulse to be "0". At a time point that the count of the counter 71 is "0", the clock pulse is applied to the 13 scale counter 70. The 13 scale counter 70 sequentially counts up from "1" to "12" every time it receives the clock pulse from the 60 scale counter 71. The 13 scale counter 70 in the clock section 68 is so designed that an initial value "1" of the initial value setting circuit 72 is preset therein when it receives at the trigger terminal T a high level coincident signal and receives the clock pulse from the 60 scale counter 71. The count time of the clock section 68 is applied to the input terminal Ia of the display unit 76 through the transfer gate 75. The stored data in the timer memory section 59 is transferred to an input terminal Ib of the display unit 76, through the transfer gate 77. The output signal of the transfer gate 77 is applied to the gate terminal of the transfer gate 75. Accordingly, the transfer gate 75 is in an OFF state when the transfer gate 77 is in an ON state, and vice versa. The display unit 76 is used in common with the display unit 36 (see FIGS. 2 and 3) of the milling time controller 80. A display section switch 78 produces a high level set signal when depressed, and continues the outputting of the high level set signal so long as it is depressed. The set signal produced is applied to the gate terminal of the transfer gate 77. The transfer gate 77 is turned off when receiving a high level signal, while it is in an ON state when no set signal, i.e. a low level signal, is applied to the gate terminal. The display unit 76 is made up of a digital display unit of the segment type as shown in FIG. 5A.

Figure 5B:
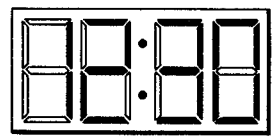

The operation of the food processor with the timer circuit shown in FIG. 4 will be described referring to FIGS. 1, 4 and 5. When the "hour" adjusting switch 62 is operated, the switch 62 is turned on to provide a high level "hour" adjusting signal for the clock section to the AND circuit 64. As a result, the AND circuit 64 provides to the "hour" adjusting circuit 66 an output pulse Pc which is produced once for one second from the output terminal Oa of the frequency dividing circuit 32a. In response to the leading edge of the output pulse from the AND circuit 64, the "hour" adjusting circuit 66 provides a count pulse to the 13 scale counter 70 of the clock section 68. Then, the 13 scale counter 70 counts up the count pulse to be "1", "2", "3", . . . every time it receives the count pulse. When the "minute" adjusting switch 63 is operated, the switch 63 is turned on to provide a high level minute adjusting signal to the AND circuit 65. An AND circuit 65 applies to the "minute" adjusting circuit 67 an output pulse in high level generated once for one second at the output terminal Oa of the frequency dividing circuit 32a. The "minute" adjusting circuit 67 produces a count pulse in response to the leading edge of the output pulse and supplies it to the 60 scale counter 71. The 60 scale counter 71 counts the count pulse to be "0", "1", "2", . . . every time it receives the count pulse. Therefore, by depressing the "hour" adjusting switch 62 and the "minute" adjusting switch 63, the current time is set in the clock section 68. Then, the 60 scale counter 71 in the clock section 68 performs the count operation every time it receives the clock pulse generated once for one second from the output terminal Ob of the frequency dividing circuit 32a. Then, the clock section 68 produces the count time (clock data) as an output signal which is then applied to the display unit 76 through the transfer gate 75. Accordingly, the display unit 76 displays the clock data of the 13 scale counter 70 in the "hour" display section, and displays the clock data of the 60 scale counter 71 in the "minute" display section. In this way (12:30) is displayed as shown in FIG. 5B. When the clock data of the 13 scale counter of the clock section 68 is "12", the comparator 73 produces a high level coincident signal at the output terminal O, which is transferred to the input terminal T of the 13 scale counter 70. Under such a condition, when the clock pulse is applied to the 13 scale counter 70 at a time point that the counter 71 counts from "59" to "0", the initial value "1" of the initial value setting circuit 72 is set in the 13 scale counter 70, and the clock data of the 13 scale counter 13 changes from "12" to "1". Therefore, the counting method of the 13 scale counter 70 never has "0", which is based on the fact that the ordinary clock denotation ranges from "1" to "12". The operation of the coffee maker with the electrical circuit shown in FIG. 4 will be described. As described referring to FIGS. 2 and 3, the coffee beans are put in the case 14 and the milling time is set, a given amount water is poured into the reservoir tank 8, and the powder switch 50 is turned on. The food processing time is assumed to be set at 12:30. After the preparatory step, the "hour" data setting switch 53 is operated, so that the "hour" data setting switch 53 is turned on to provide a high level "hour" data setting signal to the AND circuit 55. Then, the AND circuit 55 permits the output pulse from the output terminal Oa of the frequency divider 32a to pass therethrough to the "hour" data setting circuit 57. The "hour" data setting circuit 57 applies the count pulse to the 13 scale counter 60, so that the 13 scale counter 60 performs the count operation. When the "minute" data setting switch 54 for setting minute data is depressed, the switch 54 is turned on and the "minute" data setting signal at high level is applied to the AND circuit 56. The AND circuit 56 permits the output pulse of the frequency divider 32a to pass therethrough to the "minute" data setting circuit 58. The "minute" data setting circuit 58 applies the count pulse to the 60 scale counter 61 of the timer memory section 59, so that the 60 scale counter 61 starts the count operation. Therefore, by depressing the "hour" data setting switch 53 and the "minute" data setting switch 54, a desired time for the start of the milling operation and of the heater 10 may be set in the timer memory section 59. In this case, by depressing the "hour" data setting switch 53, the "minute" data setting switch 54, and the display selection switch 78, the high level signal is applied to the gate terminal of the transfer gate circuit 77. If so done, the transfer gate 77 is in an ON state, while the transfer gate 75 is in an OFF state. Accordingly, an output signal representing the set data in the timer memory section 59 is transferred to the display section 76 through the transfer gate 77. Then, the display unit 76 displays the count time of the 13 scale counter 60 in the "hour" display section and displays the count time from the 60 scale counter 61 in the "minute" display section. After storing a desired time in the timer memory section 59, if the display section switch 78 is released from its depressed state, the count time of the clock section 68 is displayed again in the display window of the display unit 76. Then, if the count time of the clock section 68 is coincident with the stored time of the timer memory section 59, the comparator 52 produces a drive signal which, in turn, turns on the output switch 52a and the start switch 37. As a result, the relay 51 is driven to close the normally open contacts 51a and 51b. The relay 51 is self-sustained by the close of the contact 51b and the electric heater 10 is current-fed by the close of the contact 51a. Simultaneously, the start switch 37 (see FIG. 3) of the milling time controller 80 is turned on by the output signal from the comparator 52 and a control signal is applied from the milling time controller 80 to the bidirectional thyristor 29 so as to drive the motor 19 for milling coffee beans for 12 seconds, for example. Then, the cutter 17 mills the coffee beans and after a short time, the hot water is poured into the case 14 for making coffee. In the case, the coffee is brewed and dripped into the bottle 4 placed on the heating plate 9. Upon the consumption of the water in the tank 8, the coffee brewing is completed. Then, the bimetal switch 27 is turned on or off to control the feed of the current to the heater 10 to heat the bottle 4 on the heater, thereby to keep the coffee in the bottle warm.

Figure 5C:
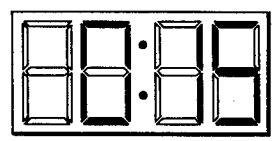

If the set data stored in the timer memory section 59 is left as it is, the comparator 52 produces a drive signal every time the count time of the clock section 68 coincides with the stored data in the timer memory section 59. As a result, the output switch 52a unnecessarily turns on in response to the drive signal from the comparator 52. The result is that, when the power source switch 50 is previously turned on, the heater 10 is heated even though the heating is unnecessary. In order to avoid such a situation, the present embodiment operates as follows. By depressing the "hour" data setting switch 53 for the timer 49 is operated to apply the count pulses Pc to the 13 scale counter 60 of the timer memory section 59, so that "0" representing the stop operation is stored in the 13 scale counter 60. In this case if the "hour" data setting switch 53 and the display selection switch 78 are simultaneously depressed, the count time of the timer memory section 59 is displayed on the display unit 76, in place of the count time of the clock section 68. Accordingly, the stored time "0" of the 13 scale counter 60 is displayed in the "hour" display section of the display unit 76, as shown in FIG. 5C. With this arrangement, since the 13 scale counter 70 of the clock section 68 counts from the "1" to "12" and never has "0", the comparator 52 never produces the drive signal and thus the output switch 52a is never turned on.

As described above, according to the present embodiment, the following effects are attained. Since the "0" representing the stop operation, which is not coincident with the clock time counted by the 13 scale counter 70, is stored in the 13 scale counter 60 of the timer memory section 59, the generation of the drive signal as a control signal from the comparator 52 is prevented when it is not necessary. Further, the "0" of the stop operation may be set in the timer memory section 59 by making use of the "hour" data setting switch 53. This feature eliminates the need of an additional switch, unlike the conventional apparatus. Accordingly, there is no increase of the number of parts and of allowing for the mounting position, resulting in ease of the manufacturing the apparatus. Unlike the conventional apparatus, no special care must be taken for the use of the "hour" setting switch and the selection switch. That is to say, the "0" may be set by operating the "hour" data setting switch 53 as in the case of the "hour" data setting. Accordingly, no additional operation is necessary, and there is no need of the selection switch unlike the conventional apparatus. The result is that the manufacture of the apparatus is simplified and the cost to manufacture is reduced. Further, the display unit 76 is so designed to display the clock display, the set time display and the "0" representative of the stop operation. Accordingly, the number of parts is smaller than the case where the display units are provided for the displays, respectively. This also contributes to the cost reduction of the apparatus. Moreover, for storing a data of the stop operation, all one has to do is to merely store "0" into the 13 scale counter 60 of the timer memory section 59. Accordingly, there is no need of great modification of the apparatus construction.

In the above-mentioned embodiment, "0" is set as the stop operation in the timer memory section 59. Various contents not coincident with the clock time of the clock section 68 may be set in the timer memory section 59.

Figure 6:
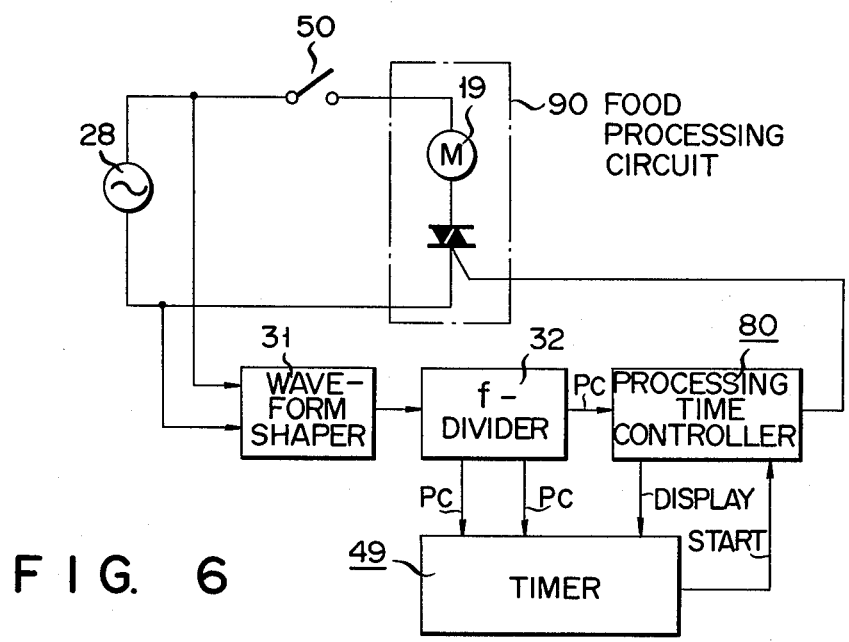
FIG. 6 is a block diagram of another embodiment of a control circuit for another food processor according to the present invention.

Turning to FIG. 6, there is shown yet another embodiment of a food processor according to the present invention which is applicable for juicers, mixers and slicers. In the present embodiment, like symbols are used to designate like portions in the circuit of the above-mentioned embodiments. In the present embodiment, the processing time is set in the same procedure as that of the milling time setting by the processing time controller 80. The food processing circuit 90 is comprised of a motor 19 and a bidirectional thyristor 29. In the present embodiment, the cutter or whipper (not shown) for the juicer, the mixer and the slicer mounted on the rotating shaft of the motor 19 is driven by the food processing circuit 90 under control of the timer 49 and the processing time controller 80. In the food processor, if the power switch 50 is in an ON state, the food process is performed at the time preset by the timer 49 for a time period set by the processing time controller. Although the timer 49, the processing controller 80 and the food processing circuit 90 are each single in the embodiment of FIG. 6. However, a plurality of these components may be provided for processing several kinds of foods.

What we claim is:

1. A food processor with a processing member operated by a motor coupled to a power source comprising:
   a switching element for connecting said motor with said power source;
   a pulse generator coupled to said power source for generating count pulses with a given period; and
   a food processing time controller including
      a set switch,
      a first counter for counting the pulses in response to operation of said set switch and for storing the operating time of said motor,
      a display unit for displaying output data of said first counter,
      a second counter for storing said output data transferred from said first counter and for counting said pulses to produce a control signal for said switching element at the time that the count result reaches a given value,
      a start switch for controlling the timing of transferring the output data of said first counter to said second counter and the counting of the second counter, and
      means which, when the counts of said first counter are to be displayed by said display unit, controls the display period of the predetermined count value which is to be set in said first counter and represents the operation time of said motor in such a manner as to be longer than the display period of the counter values other than said predetermined count value.

2. A food processor according to claim 1, wherein said first counter includes an up-counter and said second counter includes a down-counter.

3. A food processor according to claim 1, wherein said pulse generator includes a waveform shaper for generating pulses having a frequency equal to that of said power source, and a frequency dividing circuit for frequency-dividing an output signal of said waveform shaper; and
   said food processing operation time controller includes a first AND circuit which receives an output signal of said frequency dividing circuit and an output signal of said set switch, and applies its output signal to said first counter, a transfer gate for transferring the output data of said first counter to said second counter in response to an operation of said start switch, and a second AND circuit for providing the output signal of said frequency dividing circuit to the second counter as clock pulses.

4. A food processor according to claim 3, wherein said food processing operation time controller further includes a reference data generator for generating said operating time of said motor, a comparator which compares output data of said first counter with output data from said reference data generator and produces a coincident signal, a second AND circuit which receives an output signal of said first AND circuit and the output signal of said comparator, a flip-flop circuit of which the output polarity is inverted every time the output pulses of said second AND circuit is received, a third AND circuit which receives the output signal of said first AND circuit and the output signal of said comparator, and an OR circuit which receives the output signal of said flip-flop circuit and the output signal of said third AND circuit to apply its output signal to said first counter, and a fourth AND circuit which receives the output signal of said frequency dividing circuit and the control signal of said second counter, and applies to said second counter the pulses of said frequency dividing circuit.

5. A food processor with a processing member operated by a motor coupled to a power source comprising:
   a controllable switching element for connecting said motor with said power source;
   a pulse generator, coupled to said power source, including a waveform shaper for providing an output signal having pulses at a frequency equal to that of said power source and a frequency dividing circuit for frequency dividing the output signal of said waveform shaper; and
   a food processing time controller including
      a set switch,
      a first AND circuit, coupled so as to receive an output of said frequency dividing circuit and an output of said set switch,
      a first counter, coupled so as to receive an output of said first AND circuit, for storing an operating time of said motor,
      a start switch,
      a display unit for displaying output data of said first counter,
      a second counter,
      a transfer gate for transferring the output data of said first counter to said second counter in response to an operation of said start switch, and
      a second AND circuit for providing the output of said frequency dividing circuit to said second counter as a clock pulse, said second counter storing said output data transferred from said first counter through said transfer gate and counting pulses so transferred to produce a control signal for controlling said switching element at the time when the result of count reaches a predetermined value.

6. A food processor with a processing member operated by a motor coupled to a power source comprising:
   a controllable switching element for connecting said motor with said power source;
   a pulse generator, coupled to said power source, including a waveform shaper for providing an output signal having pulses at a frequency equal to that of said power source and a frequency dividing circuit for frequency dividing the output signal of said waveform shaper; and
   a food processing time controller including
      a set switch,
      a first AND circuit coupled so as to receive an output of said frequency dividing circuit and an output of said set switch,
      a reference data generating circuit for generating an operating time of said motor, a first counter, coupled to said reference data generating circuit, for storing the operating time of said motor, a comparator for comparing output data of said first counter with output data from said reference data generating circuit, a second AND circuit coupled so as to receive an output of said first AND circuit and an output of said comparator, a flip-flop circuit coupled to said AND circuit providing an output polarity inversion every time an output pulse of said second AND circuit is received, a third AND circuit coupled so as to receive the output of said first AND circuit and inverted output signal of said comparator, an OR circuit coupled so as to receive the output of said flip-flop circuit and output signal of said third AND circuit and to apply its output to said first counter, a start switch, a display unit for displaying output data of said first counter, a second counter, a transfer gate for transferring the output data of said first counter to said second counter in response to an operation of said start switch, and a fourth AND circuit for providing the output signal of said frequency dividing circuit to said second counter as a clock pulse, said second counter storing said output data transferred as a pulse from said first counter through said transfer gate and counting pulses so transferred to produce a control signal for said switching element at the time when the result of count reaches a predetermined value.

* * * * *